United States Patent [19]

Kraus

[11] Patent Number: 4,467,988
[45] Date of Patent: Aug. 28, 1984

[54] PIPE FASTENER

[75] Inventor: Willibald Kraus, Kaiserslautern, Fed. Rep. of Germany

[73] Assignee: TRW Inc., Cleveland, Ohio

[21] Appl. No.: 346,449

[22] Filed: Feb. 8, 1982

[51] Int. Cl.³ .............................................. F16L 3/22
[52] U.S. Cl. .................................. 248/68.1; 248/74.1
[58] Field of Search .................... 248/73, 74 A, 74 B, 248/74 PB, 74 R, 68 R; 24/16 PB, 17 AP, 17 B; 411/136, 137, 260; 211/107

[56] References Cited

U.S. PATENT DOCUMENTS

| | | | |
|---|---|---|---|
| T100,605 | 5/1981 | Christian | 248/68 CB |
| 1,083,471 | 1/1914 | Walton et al. | 411/136 |
| 1,398,519 | 11/1921 | Hosch | 248/DIG. 12 |
| 1,738,875 | 12/1929 | Duffy | 248/219.2 |
| 2,520,459 | 8/1950 | Dohm | 411/136 |
| 2,736,854 | 2/1956 | Will | 248/219.2 |
| 3,136,515 | 6/1964 | Potruch | 248/68 R |
| 3,385,545 | 5/1968 | Patton | 248/68 R |
| 3,400,742 | 9/1968 | Wakabayashi | 411/260 |
| 3,441,986 | 5/1969 | Pritchard | 248/68 R |
| 3,584,348 | 6/1971 | Soltysik | 248/68 R |
| 3,599,915 | 8/1971 | Soltysik | 248/68 R |
| 3,843,083 | 10/1974 | Angibaund | 248/74 R |
| 3,860,213 | 1/1975 | Heenan | 248/156 |
| 4,148,113 | 4/1979 | Dvorachek | 248/74 PB |
| 4,214,723 | 7/1980 | Voorhees | 248/74 A |
| 4,244,544 | 1/1981 | Kornat | 248/68 R |
| 4,358,080 | 11/1982 | Wolker | 248/68 R |

Primary Examiner—William H. Schultz
Assistant Examiner—Ramon O. Ramirez
Attorney, Agent, or Firm—Daniel G. Blackhurst

[57] ABSTRACT

A pipe clip, particularly for a petrol line on a motor vehicle, has a mounting section for attaching the clip to a support and one or more retaining sections. The retaining section(s) has an inner clamp for gripping the pipe around a portion of its circumference and an outer clamp which is spaced from and surrounds the clamp.

5 Claims, 8 Drawing Figures

FIG. 1
FIG. 2
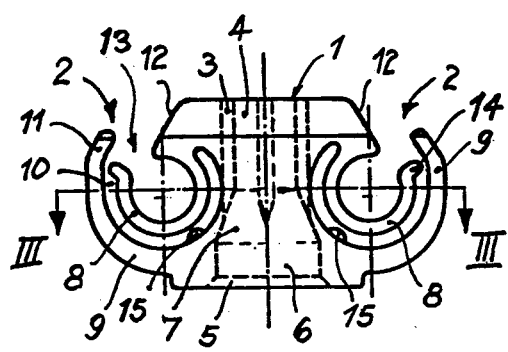
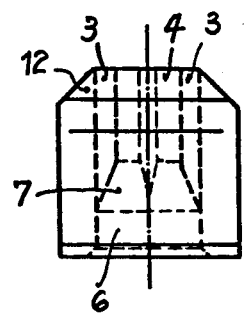
FIG. 3
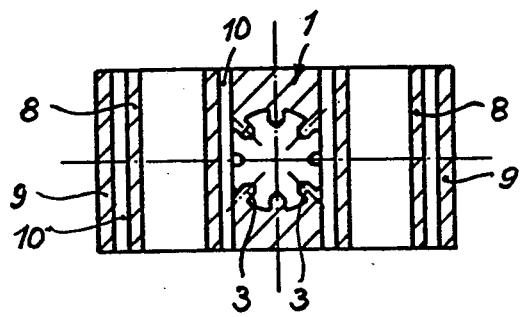

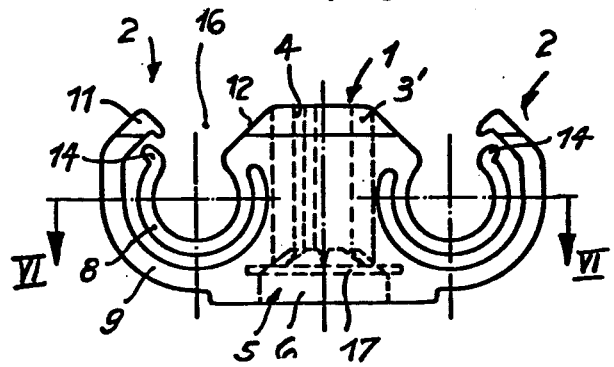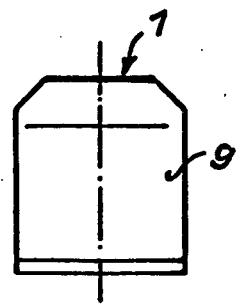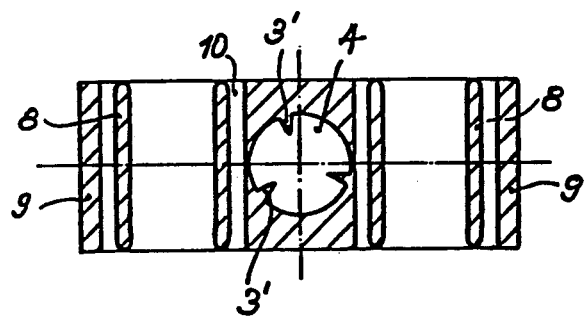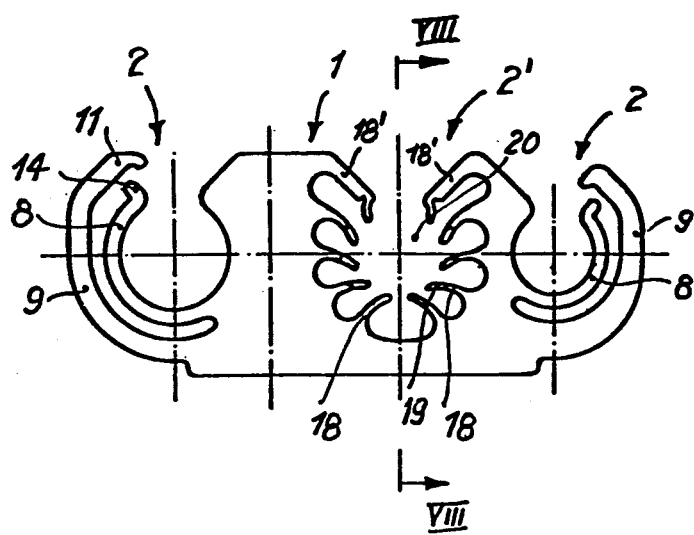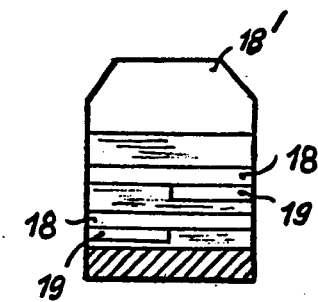

PIPE FASTENER

The invention relates to a retaining element for at least one elongate article, particularly a pipe forming part of a petrol line on a motor vehicle, comprising a mounting section for receiving a stud attached to the motor vehicle and at least one retaining section for partially enclosing the circumference of the elongate article.

In known retaining elements of this general type, the mounting section is a simple cylindrical opening which is surrounded on either side by a retaining section. Each retaining section consists of a lower U-shaped lip and an upper hook-shaped part, the front edge of which projects into the gap between itself and the lower lip. A gap is thereby formed for the insertion of a pipe. When the pipe is then pressed in further, it becomes lodged in the lower U-shaped lip, the front edge of the upper part receiving the circumference of the pipe. A disadvantage with this known retaining element is that a part of the pipe circumference is exposed and unprotected so that it may be damaged, for example in the event of impact by stones or other external effects. Moreover, no tolerance is provided so that the retaining element can only be designed for a particular pipe diameter, resulting in a larger amount of storage space needed to allow for the different pipe diameters.

In contrast, the object of the present invention is to design a retaining element of the type mentioned in the introduction so that the elongate article to be supported is perfectly protected against stone impact and so that the entire retaining element can be safely fitted on and removed from a stud, and providing a good range of tolerances for different pipe diameters.

In accordance with the present invention there is provided a retaining element for at least one elongate article, comprising a mounting section adapted to be attached to a support and at least one retaining section for partially enclosing the circumference of the elongate article, wherein the mounting section is in the form of a bearing adapted to receive a stud and comprises, at least two ribs which extend in the longitudinal direction of the bearing and are adapted in use to engage the circumference of the stud.

This brings about the advantage that, as a result of the ribs which lie in the opening of the mounting section and receive the circumference of the stud, the retaining element is properly supported on the stud attached to a motor vehicle.

According to a further aspect of the invention, we provide a retaining element wherein the bearing comprises a cylindrical entry section adjacent a truncated core section, the ribs being adjacent thereto. The truncated cone section serves in this case to receive forced-back plastic material or coating on the stud attached to the motor vehicle so that, despite this coating on the stud, the retaining element is properly held or supported on the stud. Assembly is effected by driving the retaining element on to the stud whereby the ribs become lodged in the profile of the stud. Removal is effected by twisting the retaining element off the stud.

In accordance with another feature of the invention the bearing comprises a cylindrical entry section, a locking washer adjacent the entry section and at least three adjacent longitudinal ribs thereby ensuring, by virtue of the locking washer, an additional securing of the retaining element on the stud attached to the motor vehicle. This results in a retaining element which can be subjected to high loads and which cannot be readily removed from the stud.

Also provided is a retaining element wherein the or each retaining section comprises an inner clamp, which is adapted in use to partially enclose the circumference of the elongate article, and an outer clamp which is spaced from and surrounds the inner clamp.

The two clamp-shaped holders provide the elongate article to be fastened with double protection. Since the outer clamp is spaced from and surrounds the inner clamp, the inner clamp can extend more or less corresponding to the diameter of the elongate article circumference so that a good range of tolerances is provided without the outer clamp having to be used to achieve these tolerances.

In accordance with a further feature of the invention, we provide a retaining element wherein the or each outer clamp has a lip which overlaps the adjacent inner clamp and with an outer face of the mounting section forms a press-in entry area for the insertion of the elongate article into the inner clamp. Proper assembly of the elongate article is effected in a simple manner by pressing the said article into the inner clamp. In this case the lip of the or each outer clamp and an outer face of the mounting section form a gap leading to the inner clamp, thereby making it possible for the elongate article which is to be fastened, to be fitted quickly and precisely without any great prior knowledge.

In accordance with a further feature of the invention, the inner clamp can comprise, in the press-in entry area, a nose which is directed towards the inner circumference of the outer clamp. The said nose serves to make removal a difficult operation and is supported during removal against the inner circumference of the outer clamp so that the elongate article to be supported cannot be readily removed from the inner clamp. This results in the elongate article to be fastened being very well secured in the inner clamp.

In accordance with a further feature of the invention the inner circumference of the or each outer clamp is formed with at least one spacing projection directed towards the outer circumference of the inner clamp, and the lip of the outer clamp is inclined relative to the outer face of the mounting section. This embodiment serves to support elongate articles having a small outer circumference, the spacing projection firstly bringing about an improvement in the retaining element for manufacturing reasons and secondly ensuring improved fitting of the elongate article since, during fitting of the elongate article, the inner clamp is supported on the spacing projection as long as the fitting operation remains uncompleted. The inclination of the lip of the outer clamp relative to the outer face of the mounting section ensures that an elongate article of small external diameter springs back as long as it is not perfectly located in the inner clamp. Hasty and therefore incorrect fitting is hence completely avoided.

In a further embodiment of the invention the lip of the or each outer clamp and the outer face of the mounting section form a wedge-shaped area, thereby improving the method of fitting.

In the case of a retaining element which has a mounting section arranged between two retaining sections, it is possible in a further embodiment of the invention for at least one further retaining section to be provided. Three or more elongate articles can be fastened to the retaining element by this means, it being possible for all three retaining sections to be similar in design, with an inner clamp and an outer clamp spaced therefrom.

However, it is also possible that in a further embodiment of the invention the or each additional retaining section comprises a plurality of flexible ribs which are adapted in use to engage the circumference of the elongate article. The said ribs ensure a good range of tolerances so that four different types of elongate article for example an 8 mm pipe and two 6 mm pipes, or two 8 mm pipes and a 6 mm pipe, or three 6 mm pipes or three 8 mm pipes, can be fastened by using, for example, only one retaining element. This results in a significant reduction in storage requirements.

In a further embodiment of the invention the two outer ribs of an additional retaining section can be slanted towards one another, thereby providing in turn an improved method of fitting. Moreover, each of the inner ribs can have on its front section an angled lip, and each lip can have half the width of a rib and each pair of adjacent lips are staggered towards one another. This results in a resilient and flexible reception of the elongate article within a wider range of tolerances.

The invention will be described in more detail below with the aid of exemplary embodiments shown in the accompanying drawings, wherein:

FIG. 1 shows a front view of a retaining element for two pipes;

FIG. 2 shows a side view of the retaining element according to FIG. 1;

FIG. 3 shows a section along the line III—III in FIG. 1;

FIG. 4 shows a front view of a further possible embodiment of a retaining element;

FIG. 5 shows a side view of the embodiment according to FIG. 4;

FIG. 6 shows a section along the line VI—VI in FIG. 4;

FIG. 7 shows a side view of another possible embodiment of the retaining element for supporting and holding three pipes;

FIG. 8 shows a section along the line VIII—VIII in FIG. 7.

The retaining element shown in FIG. 1 comprises a mounting section 1 and two retaining sections 2 which are arranged on either side of the mounting section 1. The mounting section 1 consists of a through opening 4 which, at the insert end 5 for a stud (not shown in detail) attached to a motor vehicle, comprises firstly a cylindrical entry section 6 followed by a truncated cone section 7. The said truncated cone section 7 in turn passes into a cylindrically shaped section of smaller diameter which is provided with axially extending ribs 3. The ribs 3 are shown in greater detail in FIG. 3. In this case the truncated cone section 7 serves advantageously to receive plastics material or coating material present on a stud when the retaining element is fitted on the stud, such material having been forced back on the stud. The ribs 3 comprise a profiled retaining element and the stud becomes lodged in the profiles, thereby creating excellent fastening of the retaining element to the stud.

Each retaining section 2 consists of an inner clamp 8 and an outer clamp 9 spaced therefrom. A gap 10 is formed between the inner clamp 8 and the outer clamp 9. The internal diameter of the inner clamp 9 serves to receive a pipe which is to be fastened. The outer clamp 9 has a lip 11 which co-operates with an inclined outer face 12 of the mounting section 1. This results in the formation of a press-in entry area 13 so that a pipe to be fastened can be inserted via this press-in entry into the inner circumference of the inner clamp 8.

The inner clamp 8 has a nose 14 which is directed towards the inner circumference of the outer clamp 9. In addition, a spacing projection 15 is provided in the bottom section in the gap 10. If a pipe is now pressed through the press-in entry area 13 into the inner clamp 8, the inner clamp 8 can press against the spacing projection 15 and does not yield as long as fitting of the pipe is uncompleted. Only after fitting is completed, i.e. when the pipe is securely mounted in the inner clamp 8, does the inner clamp return to the position shown in FIG. 1. When the pipe is removed, the nose 14 of the inner clamp 8 is supported against the inner circumference of the outer clamp 9 so that the pipe to be clamped cannot be readily removed from the inner clamp. This results in excellent clamping of the pipe in the inner clamp. By reason of having both the inner clamp and outer clamp, the pipe is protected against stone impact and undesirable external influences. The embodiment shown in FIGS. 1, 2 and 3 serves to receive pipes of smaller diameter.

A retaining element for receiving pipes of larger diameter is shown in FIGS. 4, 5 and 6. Firstly, the mounting section 1 in this embodiment has a locking washer 17 made of metal which is injected into the plastics material and has tongues projecting diagonally upwards. The press-in entry area 5 in turn has a cylindrical entry section 6 adjacent to which, above the locking washer 17, is a cylindrical section of smaller diameter, in which at least three longitudinal ribs 3' are distributed over the circumference. The said longitudinal ribs 3' receive the, for example, threaded profile of the stud or pin (not shown in detail) attached to the motor vehicle so that excellent clamping of the retaining element is achieved, through co-operation of the stud or pin with the locking washer 17 and its tongues. This embodiment is intended for high loads.

The retaining section 2 in this embodiment comprises an overlapping lip on the outer clamp 9, the lip and the outer face 12 of the mounting section 1 forming a wedge-shaped area 16. Again, the inner clamp 8 in each case comprises a nose directed towards the inner circumference of the outer clamp 9. The wedge-shaped area 16 ensures proper and secure fitting. If, on the other hand, the pipe is not mounted perfectly in the inner clamp 8, the pipe springs back out of the wedge-shaped area 16 as long as it is not perfectly located in the inner clamp. This ensures a secure fitting, it being immediately evident whether the pipe is perfectly lodged in the inner clamp.

A possible embodiment of a retaining element for three pipes is shown in FIGS. 7 and 8. In FIG. 7 the opening in the mounting section 1 adapted to receive a stud is not shown, but would be positioned on the left hand side of the mounting section in practice. In this case the two outer retaining sections 2 are designed in the same form as in the embodiment according to FIG. 1 and FIG. 4. In addition to the right-hand retaining section 2, there is provided a second retaining section 2' which comprises a plurality of flexible ribs 18 which receive part of the circumference of the pipe. The said ribs project into the interior space 20 of the retaining section 2' and the front end of each rib has a lip 19.

According to FIG. 8 the lip 19 extends not over the entire width of each rib 18, but only over half of the said width. In this case the lip 19 of one rib 18 is staggered relative to the following lip 19 of the other rib 18. This results in an excellent and flexible reception of the pipe and in a good range of tolerances so that pipes of different diameters can be readily pressed into the retaining section 2'. The reception of the pipe by ten ribs 18 or 18', as shown in the present exemplary embodiment, causes the pipe to be properly supported. In this embodiment the two outer ribs 18' in turn form a wedge-shaped area so that fitting is facilitated and correct fitting is ensured.

In a further embodiment of the invention it is also possible for a plurality of retaining sections 2 and 2' to be arranged around a mounting section 1 (not shown in detail). Therefore, any desired number of pipes can be attached to the retaining element according to the invention.

In all cases good protection against stone impact is provided, a good range of tolerances for the individual pipes is ensured and a reliable method of fitting and removal is provided.

I claim:

1. A retaining element for at least one elongate article comprising a mounting section adapted to be attached to a support and at least one retaining section for partially enclosing the circumference of the elongate article wherein the retaining section comprises an inner clamp which is adapted in use to enclose the circumference of the elongate article and an outer clamp which is spaced from and surrounds the inner clamp, and wherein the outer clamp has a lip which overlaps the adjacent inner clamp and with an outer face of the mounting section forms a press-in entry area for the insertion of the elongate article into the inner clamp.

2. A retaining element according to claim 1 wherein the lip of the outer clamp and an outer face of the mounting section form a gap leading to the inner clamp.

3. A retaining element according to claim 1 wherein the inner clamp comprises, in the press-in entry area, a nose which is directed towards the inner circumference of the outer clamp.

4. A retaining element according to claim 1 wherein the inner circumference of the outer clamp is formed with at least one spacing projection directed towards the outer circumference of the inner clamp, and the lip of the outer clamp is inclined relative to the outer face of the mounting section.

5. A retaining element according to claim 1 wherein the lip of the outer clamp and the outer face of the mounting section form a wedge-shaped area.

* * * * *